(12) United States Patent
Benoudiz et al.

(10) Patent No.: US 7,281,241 B2
(45) Date of Patent: Oct. 9, 2007

(54) SYSTEM AND METHOD FOR VISUAL DEBUGGING OF CONSTRAINT SYSTEMS

(75) Inventors: Eyal Benoudiz, Jerusalem (IL); Guy Baruch, Netanya (IL)

(73) Assignee: Cadence Design (Israel) II Ltd., Rosh Ha'ayin (IL)

( * ) Notice: Subject to any disclaimer, the term of this patent is extended or adjusted under 35 U.S.C. 154(b) by 403 days.

(21) Appl. No.: 10/045,055

(22) Filed: Jan. 15, 2002

(65) Prior Publication Data
US 2003/0140292 A1 Jul. 24, 2003

(51) Int. Cl.
G06F 9/44 (2006.01)

(52) U.S. Cl. .............. 717/132; 717/124; 717/127; 717/133; 717/144

(58) Field of Classification Search ....... 717/124–161, 717/113; 714/38
See application file for complete search history.

(56) References Cited

U.S. PATENT DOCUMENTS

| | | | |
|---|---|---|---|
| 4,937,765 A | | 6/1990 | Shupe et al. |
| 5,202,889 A | | 4/1993 | Aharon et al. |
| 5,450,586 A | * | 9/1995 | Kuzara et al. ............ 717/124 |
| 5,633,812 A | | 5/1997 | Allen et al. |
| 5,799,295 A | * | 8/1998 | Nagai ........................ 706/46 |
| 5,844,909 A | | 12/1998 | Wakui |
| 6,016,474 A | * | 1/2000 | Kim et al. ................. 717/125 |
| 6,044,214 A | | 3/2000 | Kimura et al. |
| 6,059,451 A | | 5/2000 | Scott et al. |
| 6,202,199 B1 | * | 3/2001 | Wygodny et al. .......... 717/125 |
| 6,427,232 B1 | * | 7/2002 | Ku et al. ................... 717/124 |
| 2003/0028858 A1 | * | 2/2003 | Hines |

OTHER PUBLICATIONS

Benjamin et al, A Study in Coverage-Driven Test Generation, DAC, 1999, pp. 970-975.
Debany Jr. et al, Design Verification Using Logic Tests, IEEE, 1992, pp. 17-24.
Moundanos, et al., Abstraction Techniques for Validation Coverage Analysis and Test Generation, IEEE Transactions on Computers, vol. 47, No. 1, Jan. 1998, pp. 2-14.
Piwowarski, Coverage Measurement Experience During Function Test, IEEE Proc. 15$^{th}$ Int. Conf. Software Engineering, 1993, pp. 287-301.
Greggain et al, Fault Grading, A Measure of Logic Simulation Integrity, Proc. 2$^{nd}$ Annual IEEE ASIC Seminar and Exhibit, 1989, pp. 9-2.1-9-2.4.
Sneed, State Coverage of Embedded Realtime Programs, Proc. 2$^{nd}$ Workshop on Software Testing, Verification & Analysis, 1988, pp. 245.

* cited by examiner

*Primary Examiner*—Chuck Kendall
(74) *Attorney, Agent, or Firm*—Rosenberg, Klein & Lee (57) ABSTRACT

A system and method for visualization and debugging of constraint systems and for constraint resolution. The present invention features a systematic, graphical representation that relates generation objects and generation decisions, preferably for example as a simple, two dimensional chart. The representation of relationships between generation entities and generation decisions, and the order in which generation decisions are made, help the user to identify and solve generation problems.

23 Claims, 6 Drawing Sheets

Figure 5B  Internal Cycle

Cycle between Groups

SYSTEM AND METHOD FOR VISUAL DEBUGGING OF CONSTRAINT SYSTEMS

FIELD OF THE INVENTION

The present invention is of a system and method for visualization and debugging of constraint systems, and in particular, of a system and method for constraint resolution visualization that helps the user in case the results of the resolution process do not match the expected results.

BACKGROUND OF THE INVENTION

Constraint systems are difficult to debug because they are declarative in nature, which means there is no execution process as for imperative code. Instead, constraints are evaluated by an algorithm which is obscure to the user. Examples of such constraint systems may be found in PCT Application Nos. PCT/IL01/01011 and PCT/IL01/00508, and U.S. Pat. No. 6,219,809, all of which are hereby incorporated by reference as if fully set forth herein.

Constraint based programs include generation entities which include data structures and variables whose values are determined according to constraints. These are referred to as fields in this application. Generation entities include constraints that determine the relationships between fields and other fields, or between fields and constants. Generation entities can be defined by the user input, as well as inferred by some computation which creates temporary fields for instance.

Generation entities may relate to each other, for example two fields may be related through a common constraint. Sometimes the user needs to focus on the transitive closure of some generation entity rather that the entity itself. Such transitive closure is the group of all entities that relate to other members of the group.

In a constraint based program, generateable fields are assigned by a constraint resolution process. A constraint resolution process involves a sequence of generation decisions, which are either generation events or field ordering. Generation events relate to generation entities, such as fields and constraints, and represent a change in the status or the value of the generation entity. For example, a field being assigned a specific value is a generation event related to that field. A constraint being used to reduce the permissible values of a field is a generation event related to that constraint. Field ordering represents the sequential order in which fields are being considered for generation.

Generation decisions are dynamic entities that are created as part of the constraint resolution process. Generation events are ordered according to the sequence of execution. Generation may be caused by some earlier events and may be the reason for some later events. Such causal chains are represented as paths connecting related events according to their sequential order.

Generation decisions are collected during constraint resolution and presented at a later point in time when the user wishes to debug the generation process. The generation process is known to involve at least two stages, namely static analysis and runtime, as described for example with regard to U.S. Pat. No. 6,182,258. It is advantageous to collect generation decisions during these phases, so that problems uncovered early in the process can be debugged as well. For example, static analysis may conclude that a contradiction exists within the set of constraints presented. The generation debugger can be used to view the generation decisions that led to that conclusion even though no runtime generation took place.

The background art focuses on presenting the state of the generation objects at various stages of constraint resolution, but lacks a systematic representation of the generation decisions.

The following reference discusses visualization of constraint based systems:

Analysis and Visualization Tools for Constraint Programming: Constraint Debugging (Lecture Notes in Computer Science number 1870, January 2001, by Pierre Deransart (Editor), Manuel V. Hermenegildo (Editor), Maluszynski, Springer Verlag; ISBN: 3540411372, which is hereby incorporated by reference as if fully set forth herein.

The current invention differs from prior art in two major aspects. The current invention is capable of representing complex constraints systems such as the constraints disclosed in U.S. Pat. No. 6,182,258. Such complex constraints systems may include:

1. a dynamically changing set of constraints based on the state of the constraint resolution process,
2. a hierarchical set of constraints applied to complex data structures and lists, and
3. fields that are under-constrained which are assigned a random value from the set of permissible values computed.

The other novel approach of this invention, compared to prior art is related to the representation of the constraint resolution process. Prior art teaches a static view of the set of applicable constraints, where a resolution process may be viewed as a series of such static snapshots. Such a representation omits crucial information about the reason for the transformation from one snapshot to the next.

Another approach common in the art is supplying some debug information about the constraint resolution engine, which is typically a program written in some logic programming language (Prolog for example). Such information may include the procedures that where called during resolution, contradictions and backtracking information. This information is typically presented during execution and may be used to intervene with the execution of the resolution engine for the purpose of debugging. Making use of this information requires intimate understanding of the constraint resolution procedure, which is exceedingly complex.

In contrast the current invention collects information during the execution of the constraint resolution engine, but presents that information after the execution in a semantic framework that is much simpler than the actual implementation of the constraint resolution engine. The resolution process is conceptualized using generation events and their relationship to changes that occur on field values and constraint status. Generation events present sequential relationships that provide cause and effect analysis of the constraint resolution process without requiring any knowledge of the implementation of the constraint resolution engine.

SUMMARY OF THE INVENTION

The present invention is of a system and method for visualization and debugging of constraint systems and for constraint resolution. The present invention features a systematic, graphical representation that relates generation objects and generation decisions, preferably for example as a simple, two dimensional chart. The representation of relationships between generation entities and generation decisions, and the order in which generation decisions are made, help the user to identify and solve generation problems.

The present invention differs from the background art in several major aspects. The current invention is capable of representing complex constraint systems such as the constraints and constraint systems disclosed in U.S. Pat. No. 6,182,258. Such complex constraints systems may include the following: a dynamically changing set of constraints based on the state of the constraint resolution process; a hierarchical set of constraints applied to complex data structures and lists; and fields that are under-constrained which are assigned a random value from the set of permissible values computed.

Another preferred feature of the present invention differs from the background art with regard to the representation of the constraint resolution process. The background art teaches a static view of the set of applicable constraints, where a resolution process may be viewed as a series of such static snapshots. Such a representation omits crucial information about the reason for the transformation from one snapshot to the next.

Another approach common in the art is supplying some debug information about the constraint resolution engine, which is typically a program written in some logic programming language (Prolog for example). Such information may include the procedures that were called during resolution, contradictions and backtracking information. This information is typically presented during execution and may be used to intervene with the execution of the resolution engine for the purpose of debugging. However, using such information requires intimate understanding of the constraint resolution procedure, which is exceedingly complex, such that these proposed solutions are difficult to use.

In contrast, the present invention collects information during the execution of the constraint resolution engine, but presents that information after the execution in a semantic framework that is much simpler and completely independent of any specific implementation of the constraint resolution engine. The resolution process is conceptualized using generation events and their relationship to changes that occur on field values and constraint status. Generation events present sequential relationships that provide cause and effect analysis of the constraint resolution process without requiring any knowledge of the implementation of the constraint resolution engine.

The invention may best be understood by referring to the following description and accompanying drawings that are used to illustrate embodiments of the invention. In the drawings.

DETAILED DESCRIPTION OF THE INVENTION

The present invention is described in greater detail below with regard to preferred, non-limiting embodiments thereof.

The generation debugger application according to the present invention is based on generation events collected during the generation process and static analysis phase. Each event reflects a generation operation. The description below refers to a preferred embodiment of the present invention with the Specman™ functional programming environment (Verisity Ltd., Rosh Ha'ain, Israel).

Generation Events

A generation event is a generation decision that is the result of a generation operation done during the collection phase. Every meaningful generation operation produces a generation event describing the action that was performed and other relevant data. The main events are:

Reduction—When the generator reduces the set of permissible values for a field

Set Value—When the generator sets a final value to a field

Hard Contradiction—When a field range is reduced to empty

Simplification—When an or constraint is simplified (the number of its options reduced by 1)

Edge Creation—When a new order relation is created between two fields

Soft Contradiction—When an item in the permissible range for a field contradicts a soft constraint (wherein a soft constraint is a constraint that should be considered if possible).

Reduction, Set Value, and Hard Contradiction events describe a change in a fields range.

Simplification describes a change in a constraint status.

Edge Creation describes a new order relation between two fields.

The Generation Debugger

A preferred implementation of the generation debugger according to the present invention optionally and preferably contains a data browser, a step tree, an event browser and an order browser. The data browser allows interactive selection of generation entities to be viewed. A generation entity can be selected directly. Alternatively the transitive closure to which the entity belongs can be selected. The transitive closure is the group of generation entities the selected entity relates to either directly or indirectly.

The step tree presents the sequence of steps performed by the generator, which could help identify the step where the computation diverged from the expected behavior. This divergent step may optionally be used as the starting point for the event browser. The event browser shows generation events and the order browser shows generation field order decisions. Each of these browsers is optionally implemented as a GUI (graphical user interface) and preferably enables generation events and generation field order decisions, respectively, to be viewed and browsed through by the user.

Generation events are collected during constraint resolution, including static analysis and runtime. The collected events are displayed offline upon request, preferably through one of the GUI browsers described above. The interaction of the user with the graphical debugger application according to the present invention preferably starts when the user selects an interesting item and the relevant data to be displayed with regard to that item. One or both of the event and order browsers are then preferably used to display data relevant to the queries of the user.

The preferred embodiment of the invention with regard to the above-referenced browser displays is a two dimensional chart, where the generation entities are presented on one dimension and the other dimension represents the execution sequence. Generation events are presented on the two dimensional space such that they are aligned with their related generation entities in one dimension and sorted according to their sequential order along the second dimension. Lines connecting generation events represent paths, such that a predecessor of an event along some path is a cause of that event and a successor of an event along some line is an effect of that event.

The preferred embodiment of the invention allows the user to choose the fields and constraints being displayed either individually or as a transitive closure. Events are displayed as icons, and selecting these icons more information about the events appears. The selected events may be used to navigate to the causing events that precede the selected event along some path as well as the affected events that succeed the selected event along some path.

Optionally and preferably, the user may perform debugging according to one of two preferred modes. In both modes, an item of interest is selected to begin debugging, which may represent for example an apparent contradiction. An event is then selected as the start point, for example an event that changes the value of the item. The debugging process is then performed backward, exposing all previous events that caused the chosen event, or alternatively is performed forward, exposing events which lead to the chosen event from an initial event.

EXAMPLE

Consider the following example code:

```
<'
    type operation_mode: uint[0..14];
    struct packet {
        mode: operation_mode;
        header: packet_header;
        body: packet_body;
        keep header.address > 0 => body.addr == 3;
        keep (mode == sys.mode1) => body.addr == -3;
    };
    struct packet_header {
        address: int;
    };
    struct packet_body {
        addr: int;
    };
    extend sys {
        code: uint[0..14];
        model: operation_mode;
        !next: packet;
```

-continued

```
        keep code != mode1;
        run() is also {
            for i from 1 to 1000 do {
                gen next;
            };
        };
    };
'>
```

Two constraints involve the packet.body.addr field. Some (but not all) possible random values generated for other fields make it impossible to satisfy both of those constraints, leading to a contradiction. For example, a contradiction may arise if header.address was picked to be a positive value and both sys.model and packet.mode were generated to have the same value.

In the case of a contradiction it may be difficult to tell the reason. The generation debugger may be used to identify the root cause of the problem. The following is a possible debug scenario.

Identifying the generation step where the contradiction occurred is optionally and preferably performed by selecting the step in the step tree, which identifies the source line of the failed generation action. This identifies the next field as the starting point for the event chart.

The event chart can be used to look at the events that preceded the contradiction. The event directly related to the contradiction is a reduce event that reduced the value of the field packet.body.addr to the empty set. According to one scenario, this event would be preceded by the following event:

The application of the assignment part of the constraint keep (mode=sys.model)=>body.addr==−3

Looking at the reason of this event the following events are found:

The range of packet.body.addr is reduced to 3

The state of the above constraint is set to simple, indicating it will be applied in the next step Looking at the reason why packet.body.addr is reduced to 3, the following sequence of events is found:

A reduction event, reducing the value of the field from any integer value to the value 3

The status of the constraint keep header.address>0 =>body.addr==3 is set to simple indicating it will be applied The constraint above, which has the equivalent representation keep (header.address<=0) or (body.addr==3), has an ignored status for the left hand side of the or, indicating that the generator chose the right hand side alternative.

Looking for the reason why the constraint keep (mode ==sys.model) =>body.addr==−3 was set to simple state, the following sequence of events is found:

The implication constraint, which is represented internally as keep (mode!=sys.model) or (body.addr==−3), has it's left hand side status set to ignore, indicating that the generator could not satisfy the right hand side.

A value assignment event where mode was assigned a value (e.g. 14)

A value assignment event where sys.model was assigned the same value (e.g. 14)

At this point the reason for the contradiction is clear.

Relationship Between Events

A reduction event describes the action of constraining a group of fields so that their ranges meet the constraint. To understand the underlying source and/or mechanism for the occurrence of the action, the user preferably receives the following information:

- Previous range of the reduced fields. The previous range of each field may be the initial range for that field as decided by the data type for that field, or it may be the result of some previous reduction event.
- Range of other fields involved in the reduction. These fields may have retained their initial ranges, as decide according to their data types, or they may have been reduced as the result of some previous event.
- History of the applied constraint—it may have been simplified earlier, causing an option to become false and leaving only one alternative, which was applied. Simplification may have occurred because some of the alternatives were found to be inconsistent with the state of the system at the time of simplification.

To understand a simplification event, the following information is optionally and preferably provided to the user:

- Previous state of the constraint. The previous state of the constraint may be its initial state or the state as caused by a previous event.
- Range of the field that caused one of the constraint alternatives to become false. Fields receive their ranges as explained above. A range computed for a field may be inconsistent with some of the alternatives of an OR constraint, in which case that constraint is simplified by removing the inconsistent alternatives.

To help understand a set value event, the following information is optionally and preferably provided to the user:

- Previous range of the field. This previous range may be the initial range as computed according to the field's data type, or a result of some constraint application that is represented by a prior event. The range presented corresponds to the last reduction of the field.
- The random generation distribution as defined for this field.

To understand an order event, the following information is optionally and presented to the user:

- The previous state of the constraint that caused a dependency edge to occur. A constraint that changed state because of a simplification event, for example introducing a dependency. As long as the constraint had multiple alternatives, each alternative potentially imposing a different order, no order event occurred. However when this constraint is simplified to the form of a single alternative, that remaining alternative may impose an order.

The scheme described above forms a relationship between events. Event A depends on event B if the information about the computation of B is needed in order to understand the computation of A. These relationships form a directed acyclic graph (DAG). The Generation Debugger displays these relations by expanding the graph step by step, allowing the user to navigate through the choice to:

- Step backwards from event A to B, in order to explain the computation of A
- Step forward from A to all events resulting from A
- Expand other parts of the graph as required Generation Group A generation group is defined to be a set of fields in the same struct that relate to each other through bidirectional ordering edges. Such ordering edges are used to determine the order of generating these fields when the whole struct is being generated.

This relationship is transitive. If A and B are related through a bi-directional edge, and B and C are related through a bidirectional edge, then {A, B, C} belong to the same generation group. A unidirectional edge from A to D (an item belonging to another group) implies that all of {A, B, C} should be generated before D. Unidirectional edges between items are allowed within a group. However, such unidirectional edges imply unidirectional order between the items they connect.

```
Struct t {
    ...
    gc#1 :    keep a ==b ;
    gc#2 :    keep b > c ;
    gc#3 :    keep c < 2*w ;
    gc#3 :    keep w ==   s.length < 2*w; // s is a struct
} ;
```

The example above creates a bi-directional dependency between a and b, between b and c and between c and w. The group has a unidirectional dependency between w and s.length, since s.length is not a member of the current struct.

Generation Order Graph

A generation order graph is the graph that reflects all order relationship between fields of the same struct.

The graph consists of nodes and edges. Each node represents a generation group. Each edge represents an order relation between groups. Each node contains an internal graph—an order graph of the items belonging to the same group. During static analysis, the generator computes order among fields of each type. This order may not be final because OR constraints with more than one alternative are not taken into account until they are simplified down to a single alternative. The generation order graph can change dynamically, as a result of such simplification. A new edge may be added if constraint is simplified and a generated item is removed from the graph along with all its edges. The order graph at any time consists of all the fields that were not generated yet and all edges between those fields. Fields that have been generated already may be displayed as disabled nodes or they may be removed at will.

Generation Order Cycle

Generation order cycle occurs when the generator cannot determine generation order between fields of a given struct. The reason may be a cycle between generation groups or a cycle between fields in the same group.

Transitive Closure of an Item

The transitive closure of an item is a set of fields and constraints that effect (directly or indirectly) a change in an item's state. For example, given a field X, the transitive closure of X will contain all fields and constraints involved in events that change the state of X (those items that have a direct affect on X's state), all fields and constraints involved in events that change the state of those items, etc.

The transitive closure of an item is computed recursively and may contain many items. Therefore it can optionally and preferably be limited by one or more of the following options:

Starting time—The transitive closure of X will contain all items that effect a change in X's state only from the starting time. For example, if the starting time is the end of static analysis, the transitive closure of X will not contain items that affect X's state prior to the end of static analysis.

Ending time—The transitive closure of X will contain all items that effect a change in X's state before the ending time.

Depth level—The transitive closure is computed recursively until reaching the depth level.

These options can optionally and preferably be combined.

When the transitive closure of an item is computed, all events that changed any of the items in the set are preferably displayed.

Temporary Fields

Temporary fields are those created by the generator. During the generation process, these fields behave like other fields except the set value event.

Keep x>2*y; //the field 2*y is created.

Figure 1:
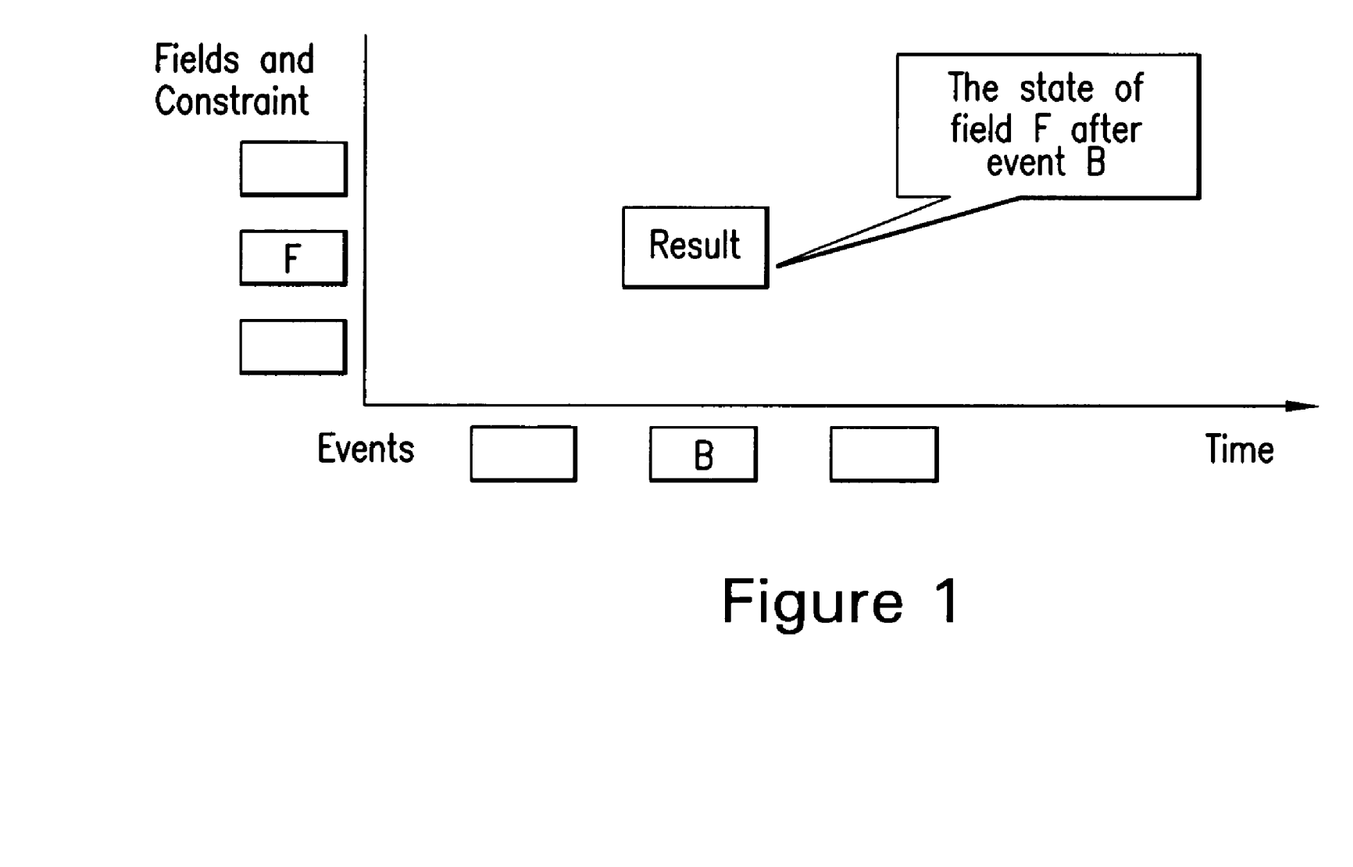
FIG. 1 illustrates an exemplary schematic arrangement of the event browser according to an exemplary embodiment of the present invention.

An optional but preferred embodiment of the present invention is further described with regard to the figures below. As shown, FIG. 1 shows an exemplary schematic arrangement of the event browser as an optional but preferred two dimensional chart, which as previously described, preferably displays event related information to the user through a GUI (graphical user interface). The terms used in this diagram are as follows.

Field icon—represent a field instance.

Constraint icon—represents a constraint.

Each field or constraint has its own row, which contains all the changes in the items state. A field (or constraint) is displayed as an icon if the table contains at least one event that changes the state of such a field (or constraint).

Event icon—represents an event. Each event has its own column, which contain all the changes caused by the event.

Result icon—represents a change in field or constraint, as a result of an event.

Figure 2:
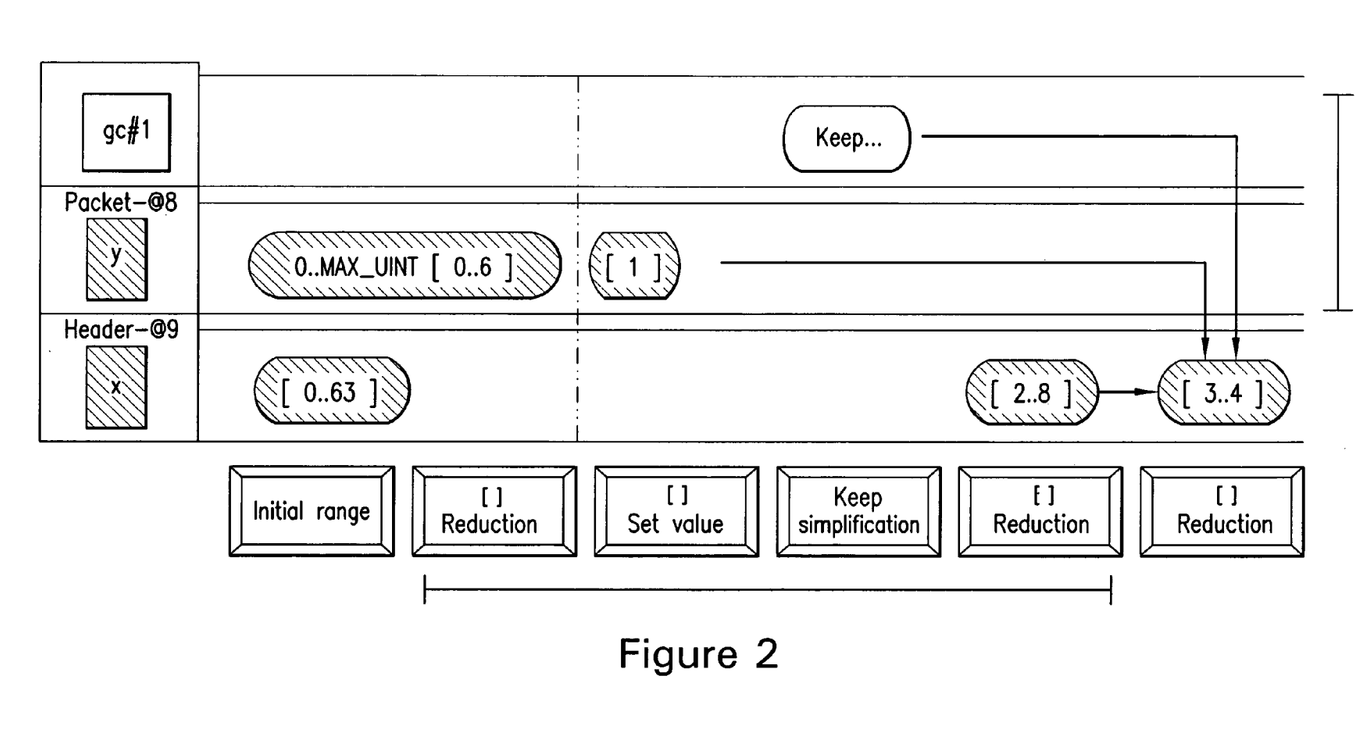
FIG. 2 illustrates an encapsulated constraint system collection phase according to an exemplary embodiment of the present invention.

FIG. 2 shows a more detailed exemplary schematic chart according to the present invention for displaying event related information, which involves the display of information for multiple events with a path between these events. This chart represents a change in the value of field x due to a reduction event, which is the result of applying a constraint gc#1. That constraint uses the value of field y that has been set previously to 1 by a set event, after being reduced first to the range 0 to 6. The initial ranges of both fields are shown in the initial step of FIG. 2.

Figure 3:
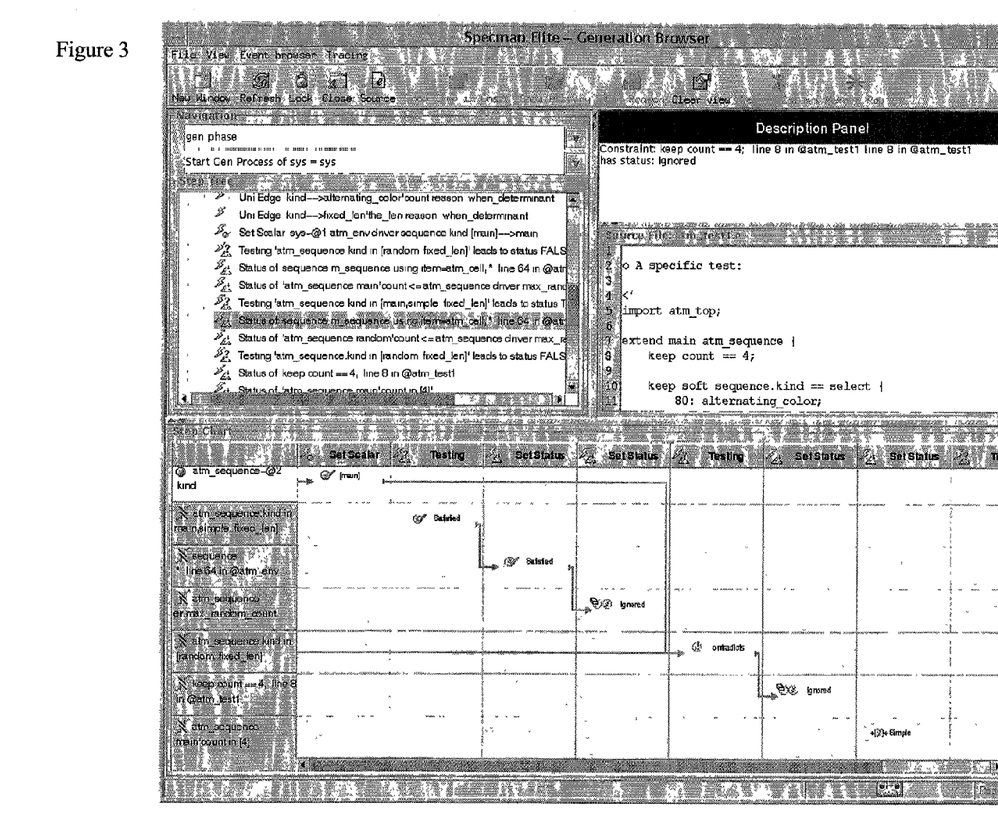
FIG. 3 illustrates a generator debugger screen, with the event chart at the bottom presenting events and oaths according to an exemplary embodiment of the present invention.
Figure 4:
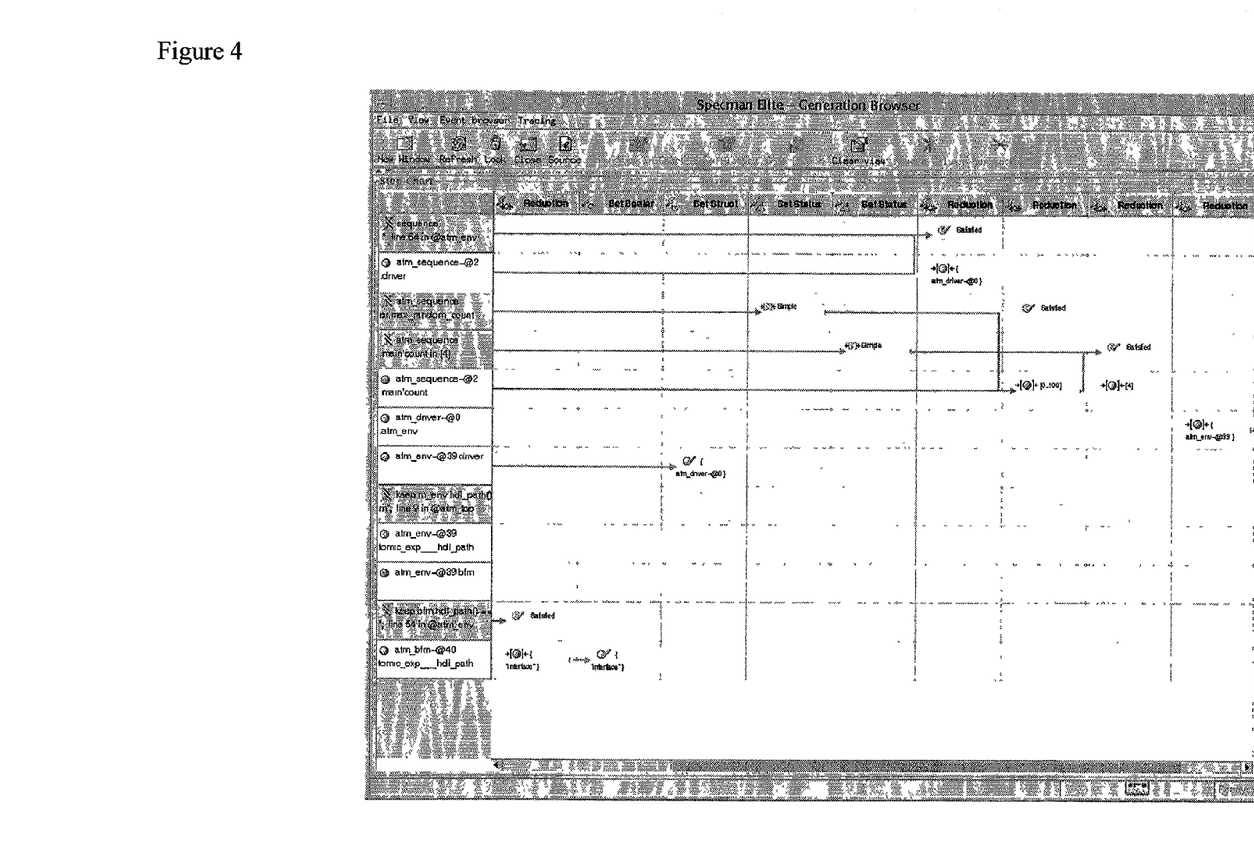
FIG. 4 illustrates an event chart, with fields and constraints on the left and generation event icons within the table according to an exemplary embodiment of the present invention.

FIG. 3 shows an example of the generator debugger screen, with the event chart at the bottom presenting events and paths. FIG. 4 shows an example of the event chart, with fields and constraints on the left and generation event icons within the table.

Figure 5A:
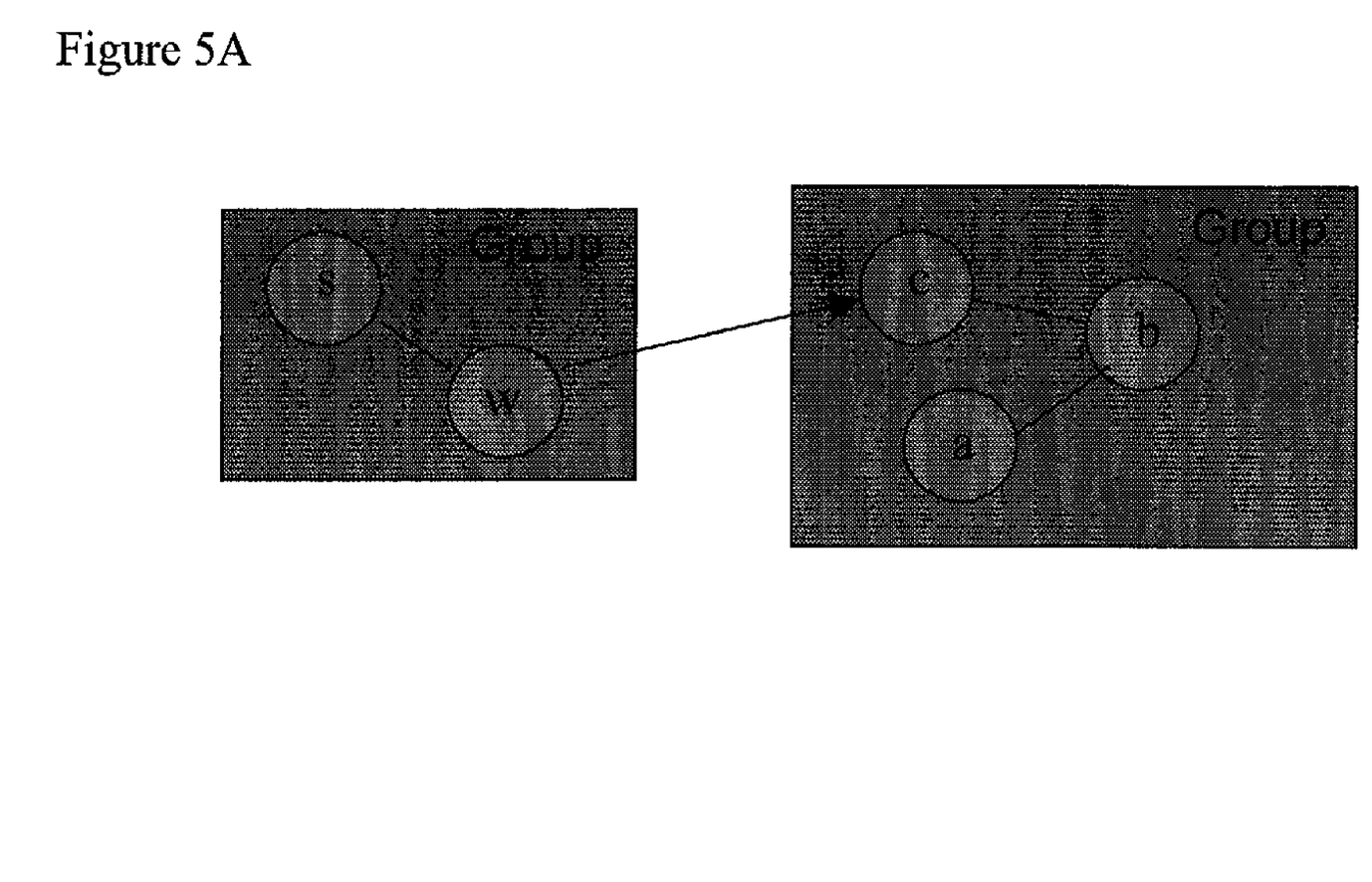
FIG. 5A illustrates an order inferred by the generation group example for struct t according to an exemplary embodiment of the present invention.
Figure 5B:
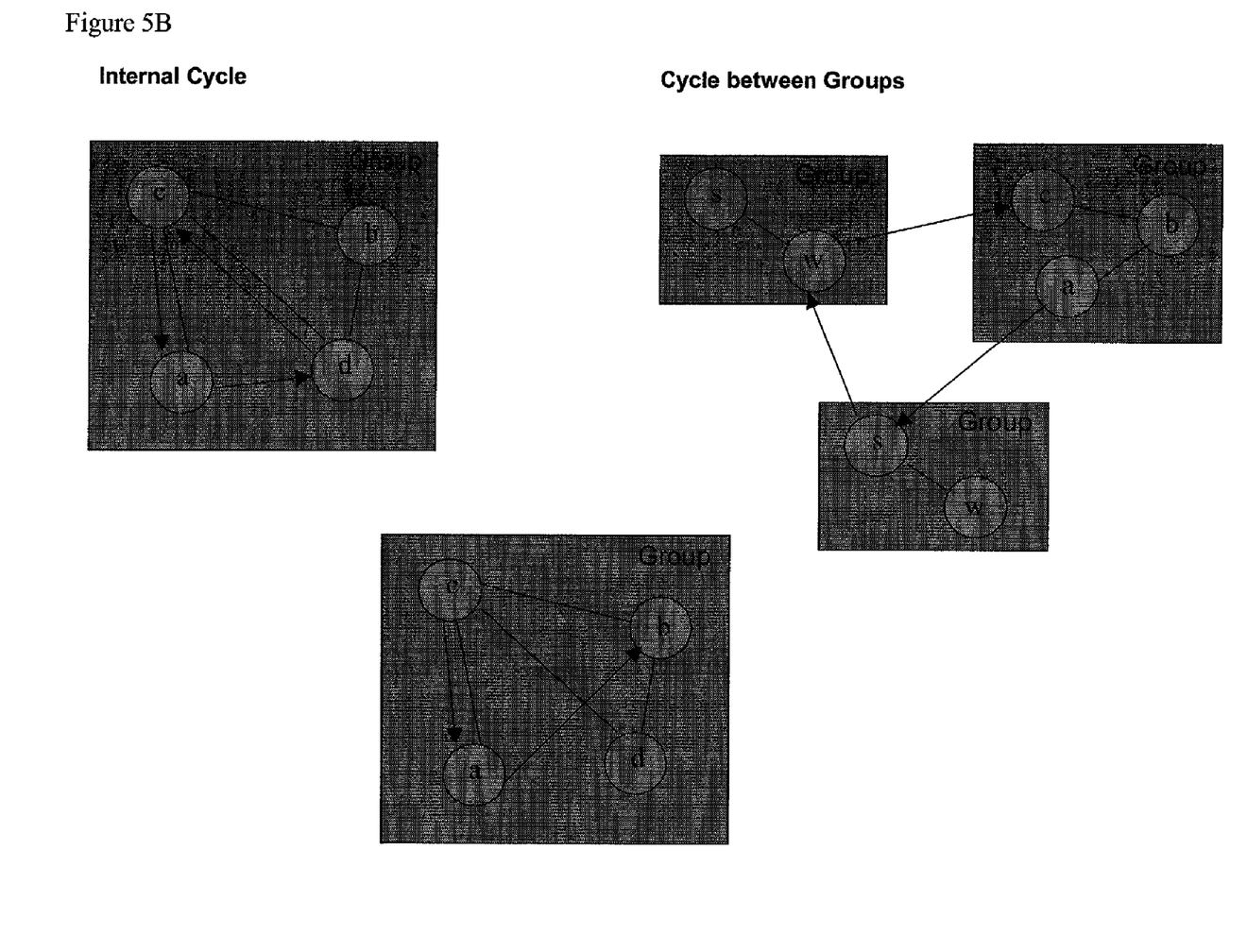
FIG. 5B illustrates cycles in ordering of generated fields according to an exemplary embodiment of the present invention.

FIG. 5A shows the order inferred by the generation group example for struct t. FIG. 5B shows cycles in the ordering of generated fields. The bottom graph shows the effect if there is no cycle, with the following constraints: c must be generated before a; a must be generated before b; and d can be generated anytime.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A declarative language encapsulatd constraint system having a debugger for visula debugging comprising:

a collector operable to collect a plurality of generation events during a test generation process, said collector further collecting from said test generation process a plurality of generation entities, said generation entities including fields representative of at least one data structure or variable and constraints for defining relationships between respective fields, wherein said generation events correspond to generation decisions executed during said test generation process on said constraints and said fields, said generation events each modifying at least one of said generation entities; and a graphical user interface operable to graphically represent and concurrently display said collected generation entities on a visual display, corresponding ones of said generation events, and indicia describing the respective modifications resulting from said corresponding generation events upon said generation entities collected responsive to said generation decisions.

2. The system of claim 1, wherein said collected generation entities and corresponding ones of said collected generation events are displayed on said graphical user interface in a two dimensional chart.

3. The system of claim 2, wherein said generation entities arc displayed on a first dimension of said chart and a second dimension represents said generation decisions' in a linked sequence, said generation events being displayed in alignment with their corresponding generation entities.

4. The system of claim 1, further comprising a data browser for interactive selection of said generation entities to be viewed.

5. The system of claim 1, further comprising a step free displaying a sequence of steps performed by said test generation process.

6. The system of claim 1, further comprising an event browser for displaying said generation events.

7. The system of claim 1, further comprising an order browser for displaying generation field order decisions.

8. A method for visual debugging of a constraint system being encapsulated in a declarative language comprising:

concurrently displaying indicia indicative of relationships between a plurality of generation events collected during constraint resolution of the constraint system from a generator and a plurality of generation entities comprising fields representative of at least one data structure or variable and dynamically changing set of constraints for defining relationships between respective fields, wherein said generation events each modify at least one of said generation entities, and an order of execution of said generation entities and indicia describing the respective modifications resulting from corresponding ones of said generation events upon said generation entities are also graphically displayed; and debugging the constraint system by determining responsive to said displayed relationships one of said generation events to identify therefrom a constraint that remaining unresolved for a corresponding one of said fields.

9. The method of claim 8, further comprising viewing a plurality of generation events sequentially from a selected generation event.

10. The method of claim 9, wherein said sequence is displayed forward from said selected generation event.

11. The method of claim 9, wherein said sequence is displayed backward from said selected generation event.

12. A method for displaying events of a generation process to a user for debugging the generation process comprising:
   extracting a sequence of generation events from a constraint resolution procedure of the generation process wherein constraints dynamically changing set of define relationships between fields representative of at least one data structure or variable, said constraint resolution procedure determining an order in which said constraints are applied in the generation process, wherein said order in which said constraints are applied is determined from an order of said sequence of generation events, said generation events each modifying at least one of said fields or constraints; and
   displaying at least a portion of said sequence of generation events to the user in a visual display concurrently with a representation of at least one generated field from at least one generation event and indicia describing the respective modifications resulting from corresponding ones of said generation events upon said field and constraint.

13. The method of claim 12, wherein said visual display includes a representation of at least one constraint from at least one generation event.

14. The method of claim 12, wherein said visual display includes a representation of a relationship between at least one of said generation events and a generation entity.

15. The method of claim 12, wherein said visual display includes at least one type of information displayed as a result of a selection by the user.

16. A declarative languaqe encapsulated constraint system having a debugger for visualizing a generation process comprising:
   an analyzer analyzing resolution of dynamically changing set of constraints for defining relationships between respective fields representative of at least one data structure or variable, a plurality of generation decisions being applied during the generation process to extract a sequence of generation events from the generation process, said generation events each modifying at least one of said fields or constraints, said constraint system being encapsulated in a declarative language, said sequence of events occurring in an order corresponding to an order in which constraint resolution decisions were made in the generation process; and
   a visual display operable to concurrently display information related to at least one field on which a constraint was applied, information related to said constraint applied, information related to said order in which said constraint resolution decisions were made, and indicia describing the respective modifications resulting from corresponding ones of said generation events upon said field and costraint.

17. The system of claim 16, wherein said visual display further displays information related to a generation event collected during static analysis.

18. The system of claim 16, wherein said visual display further displays information related to a generation event collected during program execution.

19. The system of claim 16, wherein said information is represented with at least one icon and wherein said visual display further displays information when said icon is selected.

20. The system of claim 16, wherein said visual display further displays ordering information for a plurality of fields.

21. The system of claim 20, wherein said visual display further displays ordering information based on static analysis.

22. The system of claim 20, wherein said visual display further displays ordering information based on order computed dynamically.

23. The system of claim 20, wherein said visual display further displays ordering information related to a group of fields selected through said visual display.

* * * * *